INVENTOR:
ALFRED W. BAMFORTH
ATTORNEYS

United States Patent Office 3,467,699
Patented Sept. 16, 1969

3,467,699
PRODUCTION OF CRYSTALS FROM SOLUTIONS
Alfred William Bamforth, Stockton-on-Tees, England, assignor to The Power-Gas Corporation Limited, Stockton-on-Tees, England
Continuation of application Ser. No. 283,861, May 28, 1963. This application Oct. 12, 1966, Ser. No. 586,301
Int. Cl. C07c 51/42; B01d 9/02
U.S. Cl. 260—525                                6 Claims

ABSTRACT OF THE DISCLOSURE

Production of benzoic acid crystals by forming a suspension of forming and growing crystals in an aqueous solution of benzoic acid, contacting the suspension with a supersaturated aqueous solution of benzoic acid formed from a feed liquor, withdrawing mother liquor and benzoic acid crystals from the contacted solution and suspension, in which the improvement comprises a low degree of supersaturation and maintaining the concentration difference between the feed liquor and motor liquor below approximately 2.5 grams per 100 grams water.

This application is a continuation of copending application Ser. No. 283,861, filed May 28, 1963 and now abandoned.

The present invention relates to the production of benzoic acid crystals.

In crystallization processes it is necessary to bring the crystallizing solution to a supersaturated condition and then to release the supersaturation to cause the formation and growth of crystals.

In such processes, in the crystallizer vessel the release of supersaturation of the entering liquor is balanced against crystal growth and formation and it is generally desired to release most of the supersaturation of the entering liquor by obtaining growth of existing crystals in suspension and to avoid the excessive formation of new crystal nuclei resulting in fine crystals.

The relative rates of crystal growth and formation of new crystal nuclei is dependent on the crystallized substance and the degree of supersaturation of the supersaturated solution. For many substances a high degree of supersaturation of the supersaturated solution results in a high rate of formation of new crystal nuclei leading to the production of a large proportion of relatively fine crystals, and a low degree of supersaturation of the supersaturated solution results mainly in growth with avoidance of excessive formation of new crystal nuclei, leading to the production of crystals of approximately uniform and relatively large size substantially free from fines.

Frequently crystals obtained from conventional single stage crystallization processes are small (often less than 0.1 mm. diameter) and these small crystals or fines are usually difficult to separate by known dewatering methods. The dewatered crystals may contain as much as 25% by weight of mother liquor and may form a paste. Owning to the presence of impurities in the mother liquor, the crystals obtained after drying of the crystal paste are impure due to entrained mother liquor.

According to the present invention there is provided a process for the production of benzoic acid crystals from an aqueous solution of benzoic acid which comprises forming a suspension of forming and growing crystals in an aqueous solution of benzoic acid, contacting said suspension with a supersaturated aqueous solution of benzoic acid formed from a feed liquor, withdrawing mother liquor from the contacted solution and suspension and withdrawing benzoic acid crystals from the contacted solution and suspension, the supersaturated solution being maintained at a low degree of supersaturation and the concentration difference between the feed liquor and the mother liquor to which it is added being maintained below a predetermined value. The crystals are preferably produced in at least two stages.

According to a preferred embodiment of the present invention therefore a process for the production of benzoic acid crystals from an aqueous solution of benzoic acid comprises producing benzoic acid crystals in two or more stages and feeding mother liquor from any one stage to the next succeeding stage as feed liquor, each stage comprising the steps of contacing a supersaturated solution formed from said feed liquor with a fluidized suspension of forming and growing crystals while maintaining a low supersaturation of said supersaturated solution, and maintaining the concentration difference between the feed liquor and the mother liquor to which said feed liquor is added below a predetermined value.

According to a further preferred embodiment there is provided a process for the production of benzoic acid crystals in at least two stages, each stage comprising forming a suspension of forming and growthing crystals in an aqueous solution of benzoic acid, contacting said suspension with a supersaturated aqueous solution of benzoic acid formed from a feed liquor, withdrawing mother liquor from the contacted solution and suspension and withdrawing benzoic acid crystals from the contacted solution and suspension, the supersaturated solution being maintained at a low degree of supersaturation and the concentration difference between the feed liquor and the mother liquor to which it is added being maintained below a predetermined value, the withdrawn mother liquor from any one stage providing the feed liquor for the next stage.

The difference between the solute concentrations of the feed liquor and the mother liquor is maintained below a predetermined value because it has been discovered that, when hot feed liquor of a high solute concentration is added to cooler mother liquor of a lower soluble concentration, if this concentration difference is too high, whether or not the mixed liquor becomes supersaturated without further treatment, the benzoic acid crystals will be unsatisfactory on account of their small size and difficulty of dewatering.

The predetermined value is chosen such that above said value the crystals produced are of relatively small size and are difficult to dewater, and below said value the crystals produced are of a relatively large size and are more easily dewatered.

A probable explanation for this is that localised cooling of the feed liquor takes place which may result in supersaturation in the labile field, with consequent formation of crystal nuclei, before completion of the diffusional mixing of the feed liquor with the mother liquor.

The upper limit for the concentration difference between the supersaturated solution and the mother liquor (i.e. the predetermined value) is determined experimentally and is probably dependent on the steepness of the normal solubility and the closeness of the supersolubility curve to the normal solubility curve. It has been determined that the predetermined value for benzoic acid in aqueous solution, which has a relatively flat solubility temperature characteristic, is approximately 2.5 gm./100 gm. $H_2O$.

In a process according to the present invention crystals may be produced which are of relatively large size substantially free from fines, whereas in a conventional single stage crystallisation, where the concentration of the feed liquor is relatively high, in order to obtain a required output of solute crystals the concentration difference between the feed liquor and mother liquor is generally greater than the predetermined value with resultant increased nucleation and formation of fines. In a multistage crystallisation the mother liquor from the last stage will contain an increased ratio of concentration of impurities to concentration of solute, which mother liquor may be recycled to the feed liquor supply after treatment to remove impurities.

The said super-saturated solution may be produced by cooling heated liquor in indirect heat exchange with a coolant, for example water, by heating liquor to cause evaporation of solvent, or by flash evaporation of liquor in a vacuum vessel with simultaneous cooling.

The number of stages used in a particular crystallization may be determined from the upper limit of concentration difference between the feed liquor and the mother liquor and the solubility characteristic and it has been found that a two stage process is preferred.

The supersaturation of the supersaturated solution may be controlled to maintain a desired degree by means of indicating or recording instruments for measuring temperatures, pressures and rates of flow of cooling water and heating steam. The feed liquor may be added to a stream of mother liquor withdrawn from a crystallizer vessel and the mixed liquor stream then supersaturated to provide the required supersaturation solution. The supesaturation of the mixed liquor stream can then also be controlled by varying the rate of flow of the circulated mother liquor relatively to the rate of flow of the feed liquor. The concentration of the mother liquor is controlled by means of temperature and/or pressure relatively to the concentration of the feed liquor so that the required concentration difference is maintained.

The invention will be further described by the following examples, by way of example only and in no way limitative of the invention, and with reference to the accompanying drawings in which.

Figure 2:
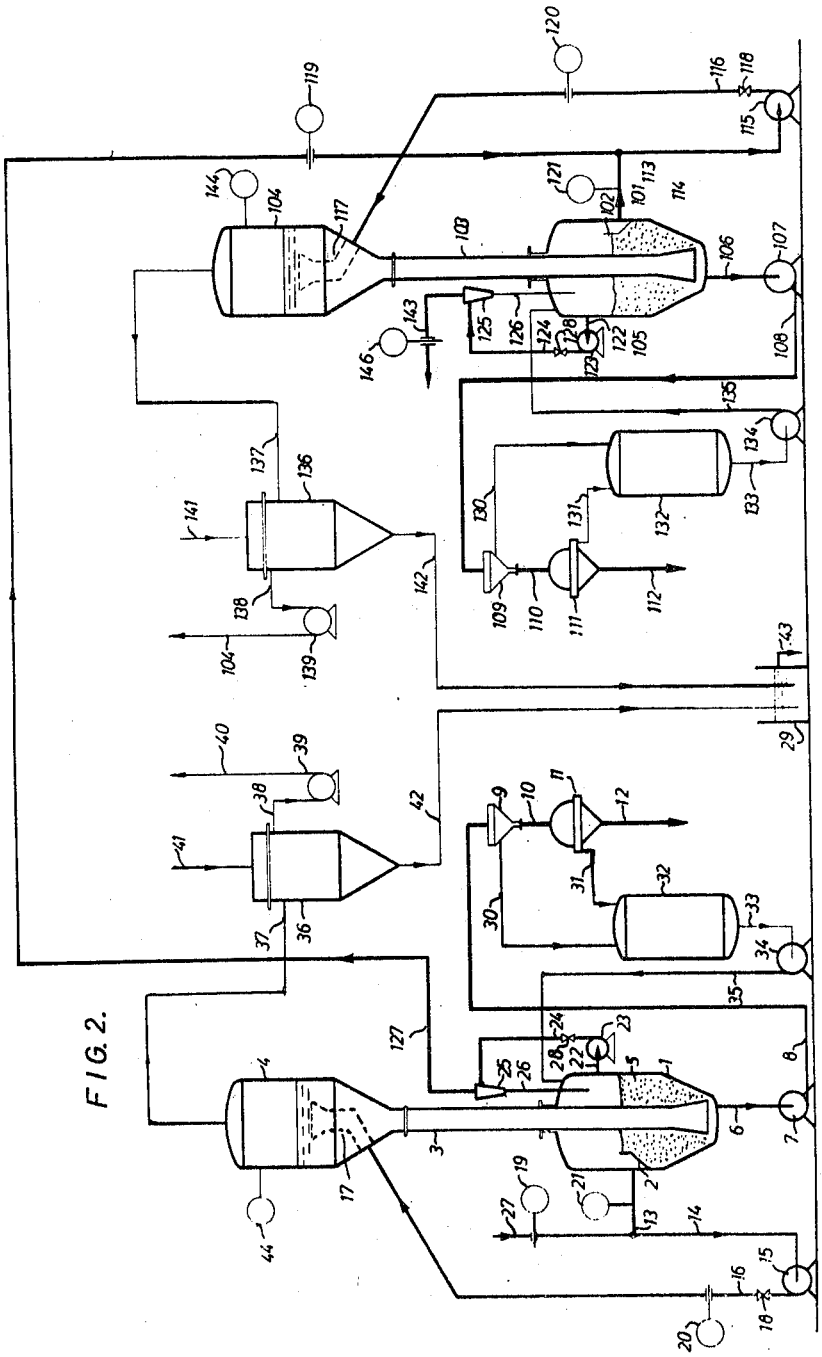
FIG. 2 is a diagrammatic arrangement of one embodiment of apparatus for carrying out the invention.

Referring to FIG. 2, the diagrammatic arrangement is that of a two stage crystallisation system. A first stage crystallizer vessel 1 is provided with an internal baffle 2 and a coaxially disposed downcomer pipe 3 connected at its top to a vessel 4 which is maintained under a vacuum.

Supersaturated liquor passes down the pipe 3 into the bottom region of the crystallizer vessel and passes up this vessel through a fluidized suspension of forming and growing crystals 5. Larger crystals sink to the bottom of the crystallizer vessel and the crystal slurry passes through an outlet pipe 6 to a slurry pump 7 which delivers the crystal slurry through a pipe 8 to a settling tank 9.

The thickened crystal slurry passes from the bottom of the settling tank 9 through an outlet pipe 10 to a centrifuge 11. Dewatered crystals pass out from the centrifuge through a conduit 12 which leads to suitable collecting and storage means (not shown).

Mother liquor passes out from the crystallizer vessel 1, in the region of the internal baffle 2, through a pipe 13 and feed liquor is introduced through a pipe 27 so that it mixes with the mother liquor withdrawn through the pipe 13 and the mixed liquor passes through a pipe 14 to a circulating pump 15 which delivers the mixed liquor through a pipe 16 to a conduit 17 inside the vessel 4. A regulating valve 18 is provided in the pipe 16 so that the rate of flow of the circulated liquor can be varied. A flowmeter 19 is provided in the pipe 27 for indicating or recording the rate of flow of the feed liquor and a flowmeter 20 is provided in the pipe 16 for indicating or recording the rate of flow of the circulated liquor. A thermometer 21 is provided in the pipe 13 for indicating or recording the temperature of the liquor leaving the crystallizer vessel 1.

Mother liquor is also withdrawn from the crystallizer vessel 1 through a pipe 22 by a pump 23 which delivers the liquor through a pipe 24 to a hydrocyclone 25. Any suspended fine crystals are separated out in the hydrocyclone and a slurry of fine crystals returned to the crystallizer through the pipe 26. Mother liquor, substantially free from suspended fine crystals, leaves the hydrocyclone 25 through a pipe 127, which delivers it as feed liquor to a second stage crystallizer. A regulating valve 28 is provided in the pipe 24 for controlling the rate of flow of the liquor withdrawn from the crystallizer vessel 1 and a flowmeter 119 is provided in the pipe 127 for indicating or recording this rate of flow.

Mother liquor from the settling tank 9 and from the centrifuge 11 passes through pipes 30 and 31 respectively to a liquor collecting tank 32 and from the bottom of this tank the liquor is returned through pipe 33, pump 34 and pipe 35 to the top of the crystallizer vessel 1.

A water jet condenser 36 is connected by a pipe 37 to the top of the vessel 4 and by a pipe 38 to a vacuum pump 39. Cooling water is passed into the condenser through a pipe 41 and effluent water, including condensate, passes out from the bottom of the condenser through a pipe 42 which terminates as a barometric leg in a seal box 29 from which water overflows through the pipe 43.

Permanent gases are discharged by the vacuum pump 39 into the atmosphere through a pipe 40.

An absoltue pressure gauge 44 indicates or records the absolute pressure in the vessel 4.

The liquor which passes into the vessel 4 through the internal conduit 17 becomes cooled and supersaturated by adiabatic flash evaporation of water under vacuum in the vessel 4. The cooled and supersaturated liquor passes down the pipe 3 into the crystallizer vessel 1, as already described.

A second stage crystallizer and ancillary equipment function in a similar manner to the first stage crystallizer and ancillary equipment. A second crystallizer vessel 101 is provided with an internal baffle 102 and a coaxially disposed downcomer pipe 103 connected at its top to a vessel 104 which is maintained under a vacuum. The ancillary equipment is denoted by reference numbers in similar relationship to the reference numbers of corresponding equipment for the first stage crystallization system.

Dewatered crystals pass out from a centrifuge 111 through a conduit 112 which leads to the product crystals collecting and storage means.

Mother liquor from the second stage crystallizer, substantially free from suspended fine crystals, leaves a hydrocyclone 125 through a pipe 143 and may be recycled to the feed liquor supply, generally after treatment for removal of impurities. A regulating valve 128 is provided in the pipe 124 for controlling the rate of flow of the liquor withdrawn from the crystallizer vessel 101 and a flowmeter 146 is provided in the pipe 143 for indicating or recording this rate of flow.

The apparatus shown in FIG. 2 and described above may be used for the preparation of benzoic acid crystals and such a preparation will be described in the following example.

Example

It has been found that when a supersaturated aqueous solution of benzoic acid is contacted with a fluidized suspension of seed crystals, in order to produce crystals of approximately uniform and relatively large size substantially free from fines the supersaturation of the solution must be kept low and the concentration difference between the feed liquor and mother liquor, to which said feed liquor is added, must be kept below 2.5 gm. of benzoic acid per 100 gm. $H_2O$.

Figure 1:
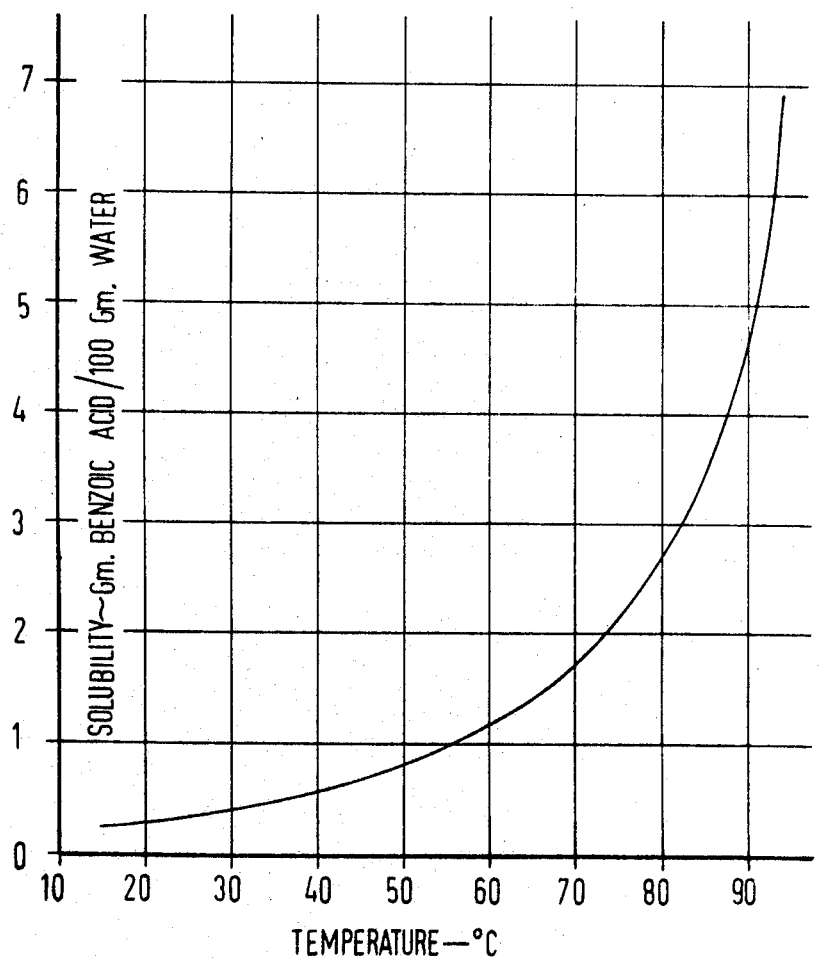
FIG. 1 is a solubility curve for benzoic acid in water at various temperatures.

When the concentration of the feed liquor is say 3.5 gm. of benzoic acid per 100 gm. $H_2O$, the desired concentration of the mother liquor is above 1.0 gm. of benzoic acid per 100 gm. $H_2O$, and referring to FIG. 1 it is seen that the saturation temperature of the mother liquor is above 56° C. This mother liquor can be fed to a second stage crystallizer in which the mother liquor is saturated at say 30° C. containing 0.4 gm. of benzoic acid per 100 gm. $H_2O$. If the initial feed liquor were fed to a single stage crystallizer in which the mother liquor was saturated at 30° C. the concentration difference between the feed liquor and mother liquor would be 3.5—0.4=3.1 gm. of benzoic acid per 100 gm. $H_2O$ and the benzoic acid crystals which are formed would consist largely of fines. Such fine crystals, generally below 0.1 mm. diameter, are difficult to separate by the various established dewatering methods and the dewatered crystals may contain up to 25% by weight of moisture.

Feed liquor consisting of an unsaturated aqueous solution of benzoic acid at 90° C. containing 3.67 gm. of benzoic acid per 100 gm. $H_2O$ is supplied through the pipe 27. The vacuum in the vessel 4 is adjusted and maintained by suitable operation of the vacuum pump 39 and the water jet condenser 36, so that the absolute pressure registered by the pressure gauge 44 is 190 mm. Hg. The temperature of the mother liquor withdrawn from the crystallizer vessel 1, as registered by the thermometer 21, will then be 70° C. This mother liquor will be saturated with benzoic acid and will contain 1.70 gm. benzoic acid per 100 gm. $H_2O$. The concentration difference between the feed liquor and mother liquor is 3.67—1.70=1.97 gm. of benzoic acid per 100 gm. $H_2O$ which is below the figure of 2.5. The regulating valve 18 of the circulating pump 15 is adjusted so that the ratio of the rate of flow of recirculated liquor, as registered by the flowmeter 20, to the rate of flow of feed liquor, as registered by the flowmeter 19, is such that the calculated supersaturation of the liquor after adiabatic flash evaporation of water in the vessel 4 is below 0.1 gm. of benzoic acid per 100 gm. $H_2O$, which is a low degree of supersaturation.

The regulating valve 28 of the pump 23 is adjusted so that a balanced rate of flow of mother liquor from the first stage crystallizer is passed, through the hydrocyclone 25, to the second stage crystallizer. The vacuum in the vessel 104 is adjusted, and maintained, by suitable operation of the vacuum pump 139 and the water jet condenser 136, so that the absolute pressure registered by the pressure gauge 144 is 45.6 mm. Hg. The temperature of the mother liquor withdrawn from the crystallizer vessel 101, as registered by the thermometer 121, will then be 40° C. This mother liquor will be saturated with benzoic acid and will contain 0.56 gm. of benzoic acid per 100 gm. $H_2O$. The concentration difference between the feed liquor to and the mother liquor from the second stage crystallizer is $$1.70 - 0.56 = 1.14 \text{ gm.}$$

of benzoic acid per 100 gm. $H_2O$, which is below the figure of 2.5. The regulating valve 118 of the circulating pump 115 is adjusted so that the ratio of the rate of flow of recirculated liquor, as registered by the flowmeter 120, to the rate of flow of feed liquor to the second stage crystallizer, as registered by the flowmeter 119, is such that the calculated supersaturation of the liquor after adiabatic flash evaporation of water in the vessel 104 is below 0.1 gm. Benzoic acid per 100 gm. $H_2O$, which is a low degree of supersaturation.

The regulating valve 128 of the pump 123 is adjusted so that a balanced rate of flow of mother liquor from the second stage crystallizer is passed, through the hydrocyclone 125, for recycling to the feed liquor supply, after treatment for removal of impurities.

The dewatered benzoic acid crystals delivered from the centrifuges 11 and 111 through the conduits 12 and 112, respectively, are of uniform and relatively large size, generally larger than 0.25 mm. diameter, contain generally not more than 10% by weight of moisture and are of increased purity.

Figure 3:
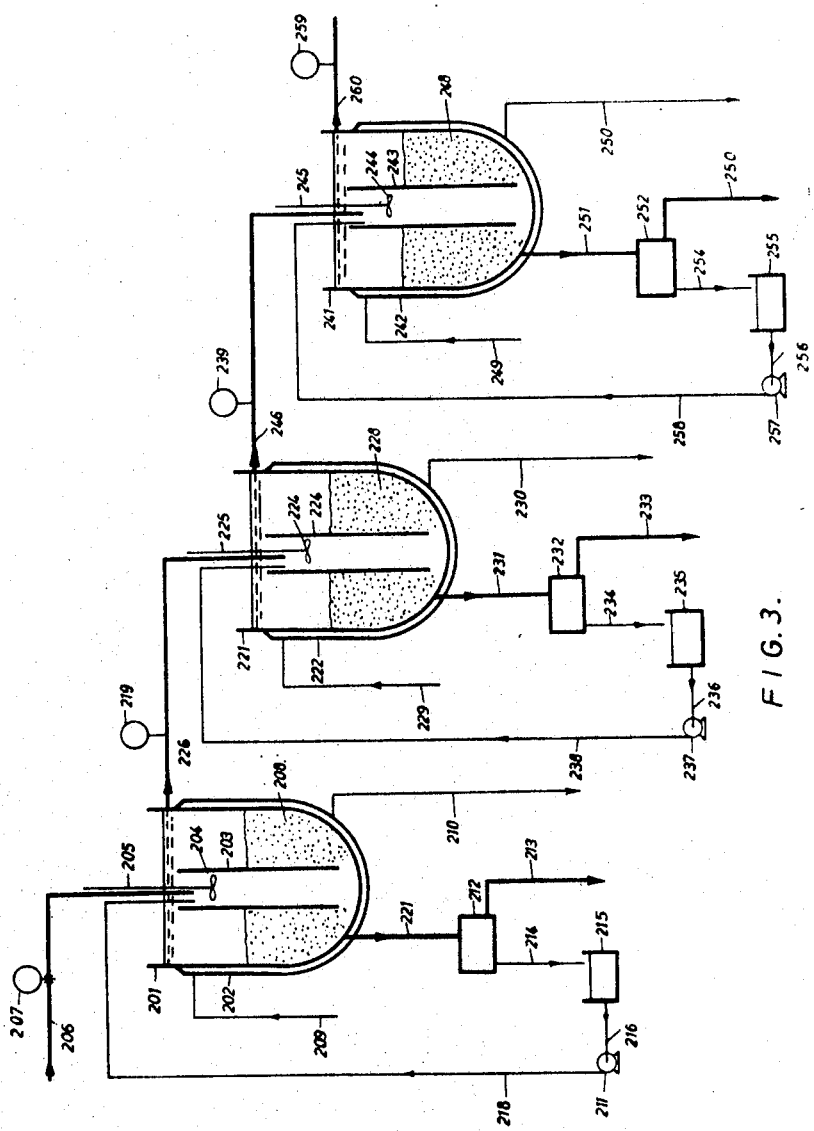
FIG. 3 is a diagrammatic arrangement of a second embodiment of apparatus for carrying out the invention.

Another apparatus suitable for carrying out the process of the present invention is described with reference to FIGURE 3 which shows a three stage crystallization system. A first stage crystallizer vessel 201 is provided with a jacket 202 and in internal coaxially disposed downcomer tube 203 in which is coaxially placed a circulating propeller 204 mounted on a shaft 205 driven by a variable speed motor (not shown).

Feed liquor is introduced through a pipe 206 which dips into liquor contained in the downcomer tube 203 and a flowmeter 207 is provided in the pipe 206 for indicating or recording the rate of flow of the feed liquor.

The circulating propeller 204 is driven at a suitable speed to obtain a desired supersaturation of the liquor in the downcomer tube 203 from the bottom of which the supersaturated liquor passes up the vessel 201 through a fluidized suspension of forming and growing crystals 208.

Cooling water is introduced through a pipe 209 into the annular space between the vessel 201 and jacket 202, the liquor in the crystallizer vessel becomes cooled and cooled mother liquor is caused to pass into the top of the downcomer tube 203 by the circulating propeller 204. Heated water leaves the annular space between the vessel 201 and jacket 202 through a pipe 210.

Larger crystals sink to the bottom of the crystallizer vessel and the crystal slurry flows under gravity through an outlet pipe 211 to dewatering equipment 212, which may consist of a centrifuge or filtering device. Dewater crystals leave the dewatering equipment through a conduit 213 which leads to suitable collecting and storage means (not shown). Mother liquor from the dewatering equipment passes through a pipe 214 to a collecting tank 215 and from this tank the liquor is returned through a pipe 216, pump 217 and pipe 218 to the crystallizer vessel 201.

Mother liquor overflows from the top of the crystallizer vessel 201 through a pipe 226 which dips into liquor contained in a downcomer tube 223 of a second stage crystallizer vessel 221.

A thermometer 219 is provided in the pipe 226 for indicating or recording the temperature of the mother liquor leaving the crystallizer vessel 201. Parts and ancillary equipment of the second stage crystallizer are denoted by reference numbers in similar relationship to the reference numbers of corresponding parts and equipment for the first stage cystallization system.

Dewatered crystals leave the dewatering equipment 232 through a conduit 233 which leads to the product crystals collecting and storage means.

Mother liquor overflows from the top of the crystallizer vessel 221 through a pipe 246 which dips into liquor contained in a downcomer tube 243 of a third stage crystallizer vessel 241. A thermometer 239 is provided in the pipe 246 for indicating or recording the temperature of the mother liquor leaving the crystallizer vessel 221. Parts and ancillary equipment of the third stage crystallizer are denoted by reference numbers in similar relationship to the reference numbers of corresponding parts and equipment for the first and second stage cystallization systems.

Dewatered crystals leave the dewatering equipment 252 through a conduit 253 which leads to the product crystals collecting and storage means.

Mother liquor overflows from the top of the crystallizer vessel 241 through a pipe 260 and may be recycled to the feed liquor supply, generally after treatment for removal of impurities. A thermometer 259 is provided in the pipe 260 for indicating or recording the temperature of the mother liquor leaving the crystallizer vessel 241.

I claim:

1. In a process for the production of benzoic acid crystals from an aqueous solution of benzoic acid comprising the steps of forming a suspension of forming and growing crystals in an aqueous solution of benzoic acid, contacting the suspension with a supersaturated aqueous solution of benzoic acid formed from a feed liquor, withdrawing mother liquor from the contacted solution and suspension and withdrawing benzoic acid crystals from the contacted solution and suspension, the improvement which comprises maintaining the supersaturated solution of benzoic acid at a low degree of supersaturation and wherein the concentration difference between the feed liquor and the mother liquor is maintained below approximately 2.5 grams/100 grams water.

2. In the process as defined in claim 1 wherein the improvement comprises maintaining the supersaturated solution of benzoic acid at a low degree of supersaturation and varying the concentration of the mother liquor to which the feed liquor is added so that the concentration difference between the supersaturated solution and the mother liquor is maintained below approximately 2.5 grams/100 grams water.

3. In a process as defined in claim 1 wherein the improvement which comprises maintaining the supersaturated solution of benzoic acid at a low degree of supersaturation and varying the concentrations of said mother liquor and feed liquor so that the concentration difference between the feed liquor and the mother liquor is maintained below approximately 2.5 grams/100 grams water.

4. In the process as defined in claim 1 wherein the improvement comprises carrying out the process in at least two stages and maintaining the supersaturated solution of benzoic acid at a low degree of supersaturation and varying the concentration of the mother liquor to which the feed liquor is added so that the concentration difference between the feed liquor and the mother liquor is maintained below approximately 2.5 grams/100 grams water, the withdrawn mother liquor from any one stage providing the supersaturated solution for the next stage.

5. In the process as defined in claim 1 wherein the improvement comprises varying the flow rate of the circulating mother liquor relative to the flow rate of the feed liquor added to the suspension, maintaining said supersaturated solution at a low degree of supersaturation and maintaining the concentration difference between the feed liquor and the mother liquor below approximately 2.5 grams/100 grams water.

6. In the process as defined in claim 1 wherein the improvement comprises carrying out the process in at least two stages and varying the flow rate of the circulating mother liquor relative to the flow rate of the feed liquor added to the suspension, maintaining said supersaturated solution at a low degree of supersaturation and maintaining the concentration difference between the freed liquor and the mother liquor below approximately 2.5 grams/100 grams water.

References Cited

UNITED STATES PATENTS

| 2,827,366 | 3/1958 | Saeman | 23—273 |
| 3,137,544 | 6/1964 | Ebner | 159—45 X |

FOREIGN PATENTS 802,117  10/1958  Great Britain.

OTHER REFERENCES

Weissberger, "Technique of Organic Chemistry," part 1, Separation and Purification; pp. 512–13, QD 251 W44 (1949).

Thompson, A. R., "Crystallizers," Chemical Engineering, October 1950 pp. 125–132.

Svanoe, "Solids Recovery by Crystallization," Chemical Engineering Progress, vol. 55, No. 5 (May 1959), p. 53.

LORRAINE A. WEINBERGER, Primary Examiner

JAMES H. NIELSEN, Assistant Examiner

U.S. Cl. X.R.

23—273